United States Patent
Hotham et al.

(10) Patent No.: US 9,311,073 B2
(45) Date of Patent: *Apr. 12, 2016

(54) UPGRADING NODES USING LEADER NODE APPOINTMENT

(71) Applicant: Metaswitch Networks Ltd, Enfield, Middlesex (GB)

(72) Inventors: David Hotham, Middlesex (GB); Jon Rowland, Middlesex (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,199

(22) Filed: Aug. 21, 2013

(65) Prior Publication Data

US 2014/0059532 A1     Feb. 27, 2014

(30) Foreign Application Priority Data

Aug. 23, 2012 (GB) .................................. 1215073.6

(51) Int. Cl.
G06F 9/44 (2006.01)
G06F 9/445 (2006.01)

(52) U.S. Cl.
CPC ........................................ G06F 8/65 (2013.01)

(58) Field of Classification Search
None
See application file for complete search history.

(56) References Cited

U.S. PATENT DOCUMENTS

| | | | | |
|---|---|---|---|---|
| 7,461,374 | B1* | 12/2008 | Balint et al. | 717/174 |
| 7,840,662 | B1* | 11/2010 | Natanzon | 709/223 |
| 2004/0098422 | A1* | 5/2004 | Levesque et al. | 707/203 |
| 2006/0080657 | A1* | 4/2006 | Goodman | 717/177 |
| 2006/0190243 | A1 | 8/2006 | Barkai et al. | |
| 2006/0294413 | A1* | 12/2006 | Filz et al. | 714/4 |
| 2007/0011485 | A1* | 1/2007 | Oberlin et al. | 714/4 |
| 2008/0005306 | A1 | 1/2008 | Kushalnagar et al. | |
| 2008/0281938 | A1* | 11/2008 | Rai et al. | 709/209 |
| 2009/0165018 | A1* | 6/2009 | Junqueira et al. | 719/313 |
| 2011/0029965 | A1* | 2/2011 | Lamba et al. | 717/172 |

FOREIGN PATENT DOCUMENTS

WO     2007136883 A2     11/2007

OTHER PUBLICATIONS

Clark, A; Bushnell, L.; Poovendran, R., "Leader selection for minimizing convergence error in leader-follower systems: A supermodular optimization approach," Modeling and Optimization in Mobile, Ad Hoc and Wireless Networks (WiOpt), 2012 10th International Symposium on , vol., No., pp. 111,115, May 14-18, 2012 URL: http://ieeexplore.ieee.org/stamp/st.*

Search Report issued in Great Britain Application No. 1215073.6.

(Continued)

*Primary Examiner* — Wei Zhen
*Assistant Examiner* — Binh Luu
(74) *Attorney, Agent, or Firm* — EIP US LLP (57) ABSTRACT

Method, apparatus and computer program product for use in the upgrade of nodes in a group of nodes in a data communications network. One or more nodes in the group to which a given upgrade is yet to be applied are identified. A given node is selected from amongst the identified one or more nodes to which the given upgrade is yet to be applied as the leader node for the group. Data is transmitted indicating the selection of the given node as the leader node. The upgrade proceeds with the given node as the leader node.

15 Claims, 3 Drawing Sheets

(56) References Cited

OTHER PUBLICATIONS

Leader election, https://en.wikipedia.org/wiki/Leader_election. Earliest publication date: Jun. 25, 2011.

Apache Zookeeper, http://zookeeper.apache.org. Earliest publication date: 2011.

JGroups—a Toolkit for Reliable Multicast Communication. www.jgroups.org. Earliest publication date: 2008.

* cited by examiner

UPGRADING NODES USING LEADER NODE APPOINTMENT

CROSS REFERENCE TO RELATED APPLICATION

This application claims benefit under 35 U.S.C. §119(a) and 37 CFR 1.55 to UK patent application no. GB 1215073.6, filed on Aug. 23, 2012, the entire content of which is hereby incorporated by reference.

TECHNICAL FIELD

The present disclosure relates to upgrading nodes.

BACKGROUND

There are various known approaches to upgrading nodes in a cluster, for example updating software on such nodes.

One known approach is to stop the entire cluster, upgrade its nodes, and then restart the cluster. This approach suffers from there being a period of time where the cluster is unable to provide any services.

Another known approach is to carry out the upgrade, for example update software, on all of the cluster nodes and, once complete, have one of the cluster nodes coordinate the upgrade of all nodes to run the updated software. However, this approach requires the updated software to be installed on all of the cluster nodes before any one of them can be upgraded. Furthermore, the coordinated upgrade is, itself, a complicated process.

It would therefore be desirable to provide improved measures for use in the upgrading of nodes.

SUMMARY

According to first embodiments, there is provided a method for use in the upgrade of nodes in a group of nodes in a data communications network, the method comprising:
identifying one or more nodes in the group to which a given upgrade is yet to be applied;
selecting a given node from amongst the identified one or more nodes to which the given upgrade is yet to be applied as the leader node for the group; and
transmitting data indicating the selection of the given node as the leader node, wherein the upgrade proceeds with the given node as the leader node.

According to second embodiments, there is provided apparatus for use in the upgrade of nodes in a group of nodes in a data communications network, the apparatus being arranged to:
identify one or more nodes in the group to which a given upgrade is yet to be applied;
select a given node from amongst the identified one or more nodes to which the given upgrade is yet to be applied as the leader node for the group; and
transmit data indicating the selection of the given node as the leader node, wherein the upgrade proceeds with the given node as the leader node.

According to third embodiments, there is provided a computer program product comprising a non-transitory computer-readable storage medium having computer readable instructions stored thereon, the computer readable instructions being executable by a computerized device to cause the computerized device to perform a method for use in the upgrade of nodes in a group of nodes in a data communications network, the method comprising:
identifying one or more nodes in the group to which a given upgrade is yet to be applied;
selecting a given node from amongst the identified one or more nodes to which the given upgrade is yet to be applied as the leader node for the group; and
transmitting data indicating the selection of the given node as the leader node, wherein the upgrade proceeds with the given node as the leader node.

Further features and advantages will become apparent from the following description of embodiments, given by way of example only, which is made with reference to the accompanying drawings.

DETAILED DESCRIPTION

Figure 1:
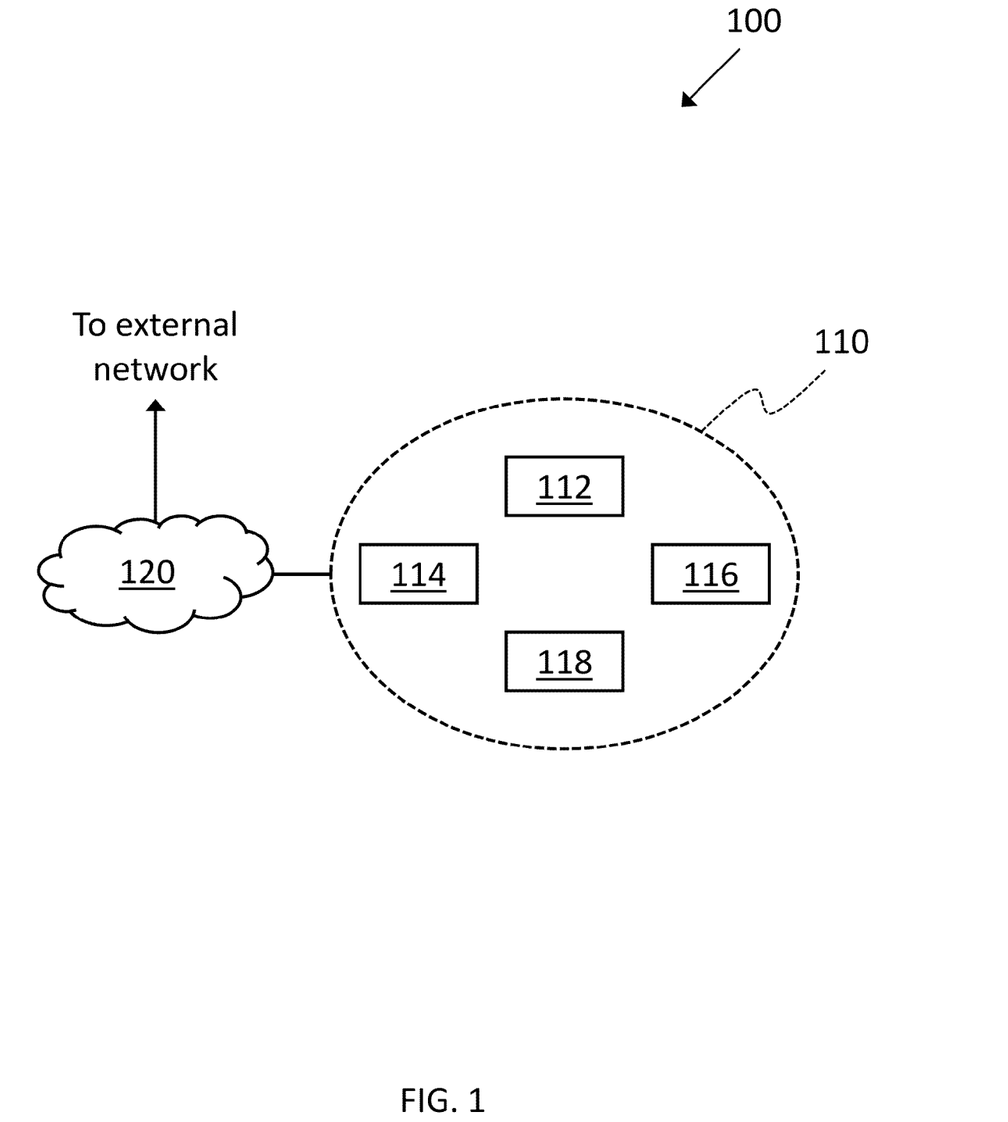
FIG. 1 is a schematic representation of a data communications network in accordance with embodiments.

FIG. 1 is a schematic representation of a data communications network 100 in accordance with embodiments.

The data communications network 100 includes a group of nodes 110. In embodiments, the group 110 forms a node cluster in that the nodes in the group 110 cooperate such that the cluster appears as though it is a single system outside of the group 110.

In the data communications network 100 depicted in FIG. 1, the group 110 includes four nodes 112, 114, 116, 118. The nodes 112, 114, 116, 118 communicate with one or more external networks via a communications network 120, such as the Internet. In some embodiments, the nodes 112, 114, 116, 118 comprise at least one processor and computer program code stored in at least one memory. The at least one memory and the computer program code are configured to, with the at least one processor, cause the nodes 112, 114, 116, 118 at least to perform a method for use in the upgrade of nodes in a group of nodes in a data communications network as described herein.

In embodiments, the nodes 112, 114, 116, 118 can communicate with each other directly, for example via wired and/or wireless connections. In some embodiments, at least some of the nodes 112, 114, 116, 118 communicate with each other via one or more of the other nodes 112, 114, 116, 118 in the group 110. In some embodiments, one or more of the nodes 112, 114, 116, 118 is a gateway node via which incoming data for the group 110 is received and/or via which outgoing data from the group 110 is transmitted. The nodes 112, 114, 116, 118 may be, for example, telephony equipment, such as telephony exchanges or switches, call control systems or the like. The nodes 112, 114, 116, 118 comprise at least one processor and at least one memory including computer program code. The at least one memory and the computer program code are configured to, with the at least one processor, cause the nodes 112, 114, 116, 118 at least to perform a method for use in the upgrade of the nodes 112, 114, 116, 118 in the group 110.

Embodiments for use in the upgrade of the nodes 112, 114, 116, 118 in the group 110 can be implemented in the data communications network 100. In the data communications network 100 depicted in FIG. 1, a given upgrade has already been applied to nodes 112 and 114 and the given upgrade is yet to be applied to nodes 116 and 118.

One or more nodes 116, 118 in the group 110 to which the given upgrade is yet to be applied are identified. In some embodiments, the given upgrade comprises one or more of a software upgrade, a hardware upgrade, a change of data format, and a change of data protocol. The software upgrade may, for example, comprise updating software to a later version and/or replacing existing software with different software and/or adding new software and/or removing existing software. The hardware upgrade may, for example, comprise updating hardware to a later version and/or replacing existing hardware with different hardware and/or adding new hardware and/or removing existing hardware. The change in data format (the format(s) of data that is used in the data communications network 100) and/or change in data protocol (the protocol(s) via which data may be communicated) may be as a result of upgrading the software and/or hardware and/or may occur for other reasons.

In embodiments, a leader node is selected from the nodes 112, 114, 116, 118 in the group 110 by a leader node selection node which is a node in the group 110. In embodiments, the leader node is selected from the nodes 112, 114, 116, 118 in the group 110 by a plurality of the nodes 112, 114, 116, 118 cooperating to elect the leader node, for example using a voting process. In embodiments, the leader node is selected from the nodes 112, 114, 116, 118 in the group 110 by a leader node selection entity that is not in the group of nodes. The term leader node selector is used herein to refer to one or more nodes or entities that select the leader node from the nodes 112, 114, 116, 118 in the group 110.

In embodiments, the leader node selector receives data that relates to at least one node 112, 114, 116, 118 in the group 110. The identification of the one or more nodes 116, 118 in the group 110 to which the given upgrade is yet to be applied is based at least in part on the received data. The data may comprise one or more predetermined parameters indicating that the given upgrade has already been applied to the at least one node in the group 110. In some embodiments, one or more of the nodes 112, 114, 116, 118 communicate, for example by broadcasting, status information containing current version information. In some embodiments, all of the nodes 112, 114, 116, 118 communicate, for example by broadcasting, status information containing their current version information so that each of the nodes 112, 114, 116, 118 in the group 110 has version information for each of the other nodes 112, 114, 116, 118 in the group 110.

In some embodiments, the leader node selector receives data in response to the given upgrade having been applied to one or more nodes 112, 114 in the group 110. One or more of the nodes 112, 114, 116, 118 in the group 110, for example one or more of the nodes 112, 114 to which the given upgrade has already been applied and/or one or more of the nodes 116, 118 to which the given upgrade is yet to be applied, may transmit the data in response to the given upgrade having been applied to the one or more nodes 112, 114 in the group 110. For example, some or all of the nodes 112, 114, 116, 118 may broadcast status information when the version of software at a node 112, 114, 116, 118 changes following a software upgrade.

In some embodiments, the leader node selector receives data in response to one or more changes to the membership of the group 110. One or more of the nodes 112, 114, 116, 118 in the group 110, for example one or more of the nodes 112, 114 to which the given upgrade has already been applied and/or one or more of the nodes 116, 118 to which the given upgrade is yet to be applied, may transmit the data in response to the membership of the group 110 having changed. For example, one or more of the nodes 112, 114, 116, 118 in the group 110 may no longer be a member of the group 110 and/or one or more new nodes may have become a member of the group 110. Some or all of the nodes 112, 114, 116, 118 may broadcast status information when the membership of the group 110 changes.

A given node, for example node 118, to which the given upgrade is yet to be applied is selected, from amongst the identified one or more nodes in the group to which the given upgrade is yet to be applied, by the leader node selector as the leader node for the group 110. The leader node is responsible for performing one or more activities in the group 110. The leader node may be responsible for organizing one or more tasks in the group 110, such as checking whether other nodes in the group 110 have a copy of given data and, if not, providing the given data to nodes that do not have a copy of it. In some embodiments, the nodes 112, 114, 116, 118 may replicate data, such as configuration data, among themselves. In some embodiments, the leader node receives some or all incoming data for the group 110 and replicates that data to all other nodes in the group 110. For example, the nodes 112, 114, 116, 118 may be telephone exchanges, and the data being replicated might be their configuration.

In some embodiments, one node 112, 114, 116, 118 in the group 110 is nominated, appointed, elected or otherwise selected as the leader node selector that is responsible for selecting the leader node for the group 110 on behalf of the group. The choice of which node 112, 114, 116, 118 is the coordinator node may be arbitrary (for example if each of the nodes 112, 114, 116, 118 is equally capable of being the leader node) and the coordinator node could, for example, be the node with 112, 114, 116, 118 the lowest IP address.

The choice of which node 112, 114, 116, 118 is the coordinator node may be more considered. For example, some of the nodes 112, 114, 116, 118 may have one or more properties that make them more or less suitable for being the coordinator node than the other nodes 112, 114, 116, 118. In such cases, the coordinator node may be selected based at least in part on having the one or more properties. In some embodiments, the coordinator node accumulates status information from the other nodes 112, 114, 116, 118, and uses the accumulated status information to pick a leader node from among the nodes to which the given upgrade has not yet been applied.

Data indicating the selection of the given node 118 as the leader node is transmitted, wherein the upgrade proceeds with the given node 118 as the leader node. For example, where a coordinator node is employed, the coordinator node communicates, for example by broadcasting, a message declaring that the given node 118 has been selected as the leader node. Other nodes in the group 110 can therefore identify the leader node. The leader node (or another node in the group 110) may notify a management system (not shown) that is responsible for managing the group 110 that it is now the leader node. In some embodiments, the management system may transmit data, such as configuration data, for the group 110 only to the leader node, and changes on the leader node may be replicated to and applied on other nodes in the group 110.

In embodiments, one or more further nodes 112, 114 in the group 110 to which the given upgrade has already been applied are identified. The one or more further nodes 112, 114 are disregarded for the purposes of the selection of the leader node for the group 110. In other words, the one or more further nodes 112, 114, to which the given upgrade has already been applied, are not selected as the leader node for the group 110 because it is desired for the leader node to be a node to which the given upgrade is yet to be applied.

In some embodiments, data communicated by a node to which the given upgrade is yet to be applied can be understood by a node to which the given upgrade has been applied. In some embodiments, data communicated by a node to which the given upgrade has been applied cannot be understood by a node to which the given upgrade has not yet been applied. Thus, even if, for example the data format may change, or indeed does change, following the upgrade, the group 110 may contain at least one node to which the given upgrade is yet to be applied and at least one node to which the given upgrade has already been applied. In particular, where the node(s) to which the given upgrade has already been applied are capable of understanding the data format communicated by the node(s) to which the given upgrade is yet to be applied and where a leader node is selected from among the node(s) to which the given upgrade is yet to be applied, the leader node communicates data in a format that can be understood by both the node(s) to which the given upgrade has already been applied and the node(s) to which the given upgrade is yet to be applied.

It is possible that there is just one remaining node in the group 110 to which the upgrade is yet to be applied and that one remaining node experiences a failure. Where data communicated by a node to which the given upgrade has been applied cannot be understood by a node to which the given upgrade has not yet been applied, it would be undesirable that a node to which the given upgrade has already been applied be selected as the leader node and then the given node be allowed to re-join the group 110. This is because data would be communicated by the leader node which would not be understood by the given node.

In some embodiments, a decision is made as to whether a different node in the group of nodes should be selected as the leader node based at least in part on detecting one or more predetermined triggers. The one or more detected predetermined triggers may comprise the given node no longer being a member of the group of nodes. The one or more detected predetermined triggers may comprise failure of the given node.

In some embodiments, the selection of the given node as the leader node is maintained at least temporarily for a given time period after detection of the one or more predetermined triggers.

The nodes in the group 110 may remember that the group 110 contains a node to which the given upgrade is yet to be applied, even if that node is not currently visible. In some embodiments, a new leader node is not selected until that node rejoins the group 110 or until the group 110 is reconfigured to exclude that node. This may be appropriate when the failure of the node to which the given upgrade is yet to be applied is expected to be brief, and the non-availability of a leader node for the group 110 is not critical for short periods.

In some embodiments, in response to detecting the one or more predetermined triggers, a node to which the given upgrade has already been applied is selected as the leader node if the given node was the last remaining node to which the given upgrade had not yet been applied. Thus a node to which the given upgrade has already been applied is selected as the leader node but the given node to which the given upgrade is yet to be applied is not allowed to become a member of the group 110 whilst the leader of the group is still a node to which the given upgrade has already been applied. To become a member of the group 110 again, the upgrade is first to be applied to that node. This approach may be appropriate when the failure of the node to which the given upgrade is yet to be applied is expected to persist for sufficiently long that the lack of a leader node for the group 110 would be undesirable. Thus, in some embodiments, after selecting the node to which the given upgrade has already been applied as the leader node, the given node is excluded from being a member of the group of nodes until the given upgrade has been applied to the given node.

Upgrading the nodes in the group 110 this way facilitates a more straightforward upgrade process. Each node 112, 114, 116, 118 can be upgraded as and when desired, until all of the nodes 112, 114, 116, 118 in the group 110 have been upgraded. The risk inherent in upgrading, for example in terms of software upgrading, is thus mitigated. For example, the upgraded software may contain a bug or may have some undesired effect when run. Upgrading approaches in which all nodes are upgraded at or about the same time may result in the bug or undesired effect being present across the group 110, with potentially serious consequences. Instead, by upgrading the nodes in a manner according to embodiments described herein, the nodes may be upgraded individually and separately, at whatever rate is desired. Bugs or undesired effects in relation to the upgraded software can therefore be resolved whilst they still impact only a small number of nodes to which the upgrade has already been applied.

Figure 2:
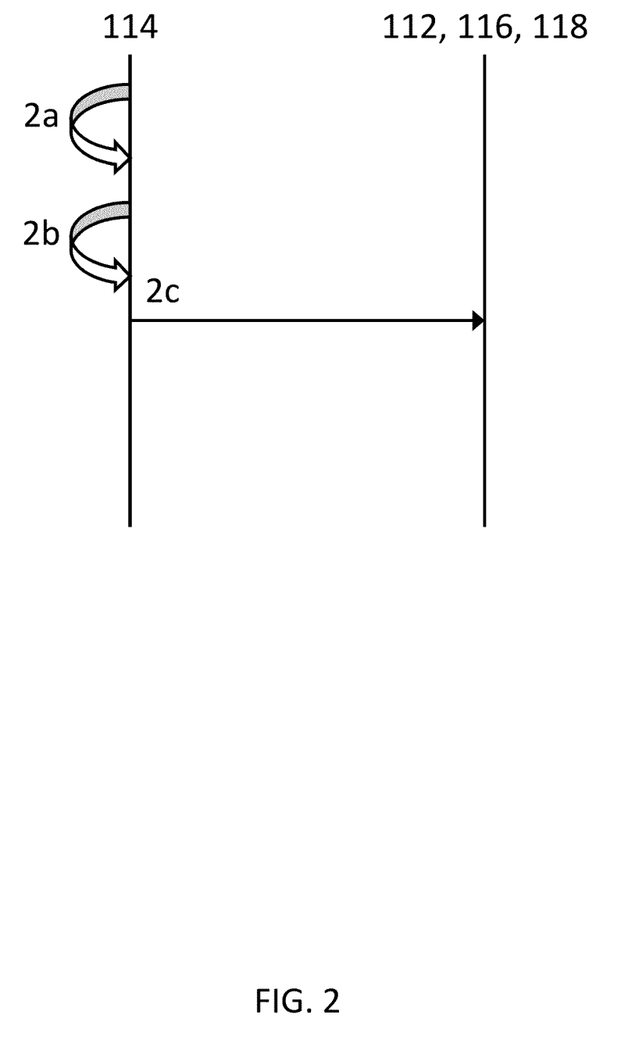
FIG. 2 is a sequence diagram showing a method for use in the upgrade of nodes in a group of nodes in accordance with embodiments.
Figure 3:
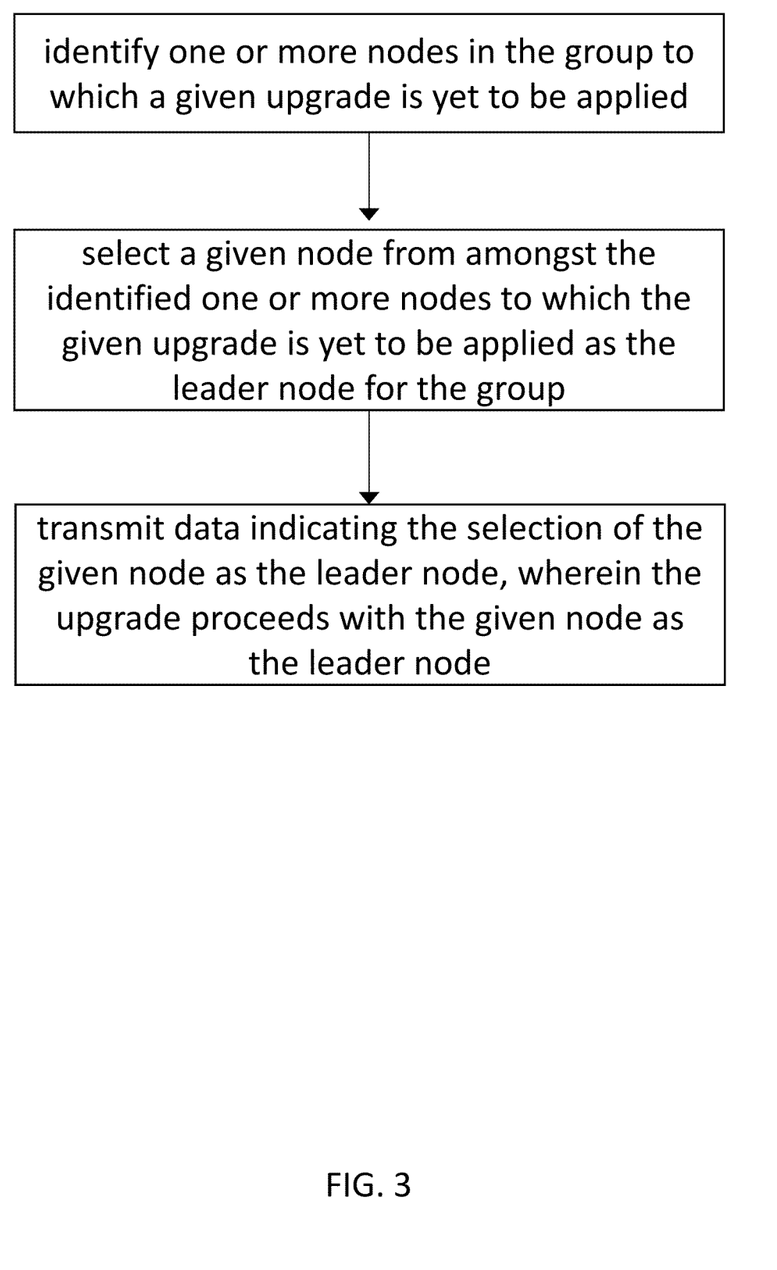
FIG. 3 is a sequence diagram showing a method for use in the upgrade of nodes in a group of nodes according to one or more embodiments of the present invention.

FIG. 2 is a sequence diagram showing a method for use in the upgrade of nodes in a group of nodes in a data communications network in accordance with embodiments.

In embodiments, one of the nodes in the group 110, for example node 114, is selected as a leader node selection coordinator node. The leader node selection coordinator node is responsible for selecting the leader node on behalf of the group 110.

At step 2*a*, the leader node selection coordinator node 114 identifies one or more nodes 116, 118 in the group 110 to which a given upgrade is yet to be applied.

At step 2*b*, the leader node selection coordinator node 114 selects a given node, in this case node 118, to which the given upgrade is yet to be applied as the leader node for the group 110.

At step 2*c*, the leader node selection coordinator node 114 transmits data indicating the selection of the given node 118 as the leader node, for example by broadcasting the data to the other nodes 112, 116, 118 in the group 110. The upgrade proceeds with the given node 118 as the leader node.

Various measures (a method, apparatus, computer software adapted to perform a method, and a computer program product comprising a non-transitory computer-readable storage medium having computer readable instructions stored thereon, the computer readable instructions being executable by a computerized device to cause the computerized device to perform a method) for use in the upgrade of nodes in a group of nodes in a data communications network are provided. One or more nodes in the group to which a given upgrade is yet to be applied are identified. A given node to which the given upgrade is yet to be applied is selected as the leader node for the group. The given node is selected from amongst the identified one or more nodes to which the given upgrade is yet to be applied. Data indicating the selection of the given node as the leader node is transmitted. The upgrade proceeds with the given node as the leader node.

Hence, the risk inherent in upgrading is reduced and the process of upgrading the nodes in the group is made more straightforward and/or simplified. Each node in the group can be upgraded when desired, until each of the nodes in the group has been upgraded.

In some embodiments, one or more further nodes in the group to which the given upgrade has already been applied are identified. The one or more further nodes are disregarded for the purposes of the selecting.

In some embodiments, data relating to at least one node in the group is received. The identifying is based at least in part on the received data.

In some embodiments, the data is received in response to the given upgrade having been applied to one or more nodes in the group.

In some embodiments, the data is received in response to one or more changes to the membership of the group.

In some embodiments, the given upgrade comprises one or more of: a software upgrade; a hardware upgrade; a change of data format; and a change of data protocol.

In some embodiments, data communicated by a node to which the given upgrade is yet to be applied can be understood by a node to which the given upgrade has been applied.

In some embodiments, data communicated by a node to which the given upgrade has been applied cannot be understood by a node to which the given upgrade has not yet been applied.

In some embodiments, it is decided whether a different node in the group of nodes should be selected as the leader node based at least in part on detecting one or more predetermined triggers.

In some embodiments, the one or more detected predetermined triggers comprise the given node no longer being a member of the group of nodes.

In some embodiments, the one or more detected predetermined triggers comprise failure of the given node.

In some embodiments, the selection of the given node as the leader node is maintained at least temporarily, for a given time period after detection of the one or more predetermined triggers.

In some embodiments, in response to detecting the one or more predetermined triggers, a node to which the given upgrade has already been applied is selected as the leader node if the given node was the last remaining node to which the given upgrade had not yet been applied.

In some embodiments, after selecting the node to which the given upgrade has already been applied as the leader node, the given node is excluded from being a member of the group of nodes until the given upgrade has been applied to the given node.

The above embodiments are to be understood as illustrative examples. Further embodiments are envisaged.

In some embodiments, one or more nodes in the group broadcast status information and one of the nodes in the group 110 acts as a leader node selection coordinator node.

Embodiments have been described above in which all nodes in the group 110 broadcast status information based on which the leader node is selected. In some embodiments, some or all of incoming data for the group 110 is directed through a fixed coordinator node and the coordinator node transmits the incoming data to the leader node. Nodes in the group send their status information only to that coordinator node and the coordinator node is responsible for choosing the leader node on behalf of the group. Although the coordinator node becomes a single point of failure the implementation may become easier where the choice of coordinator is fixed because it is not necessary to select a coordinator node each time a leader node is to be selected.

In some embodiments, the nodes in the group 110 may cooperate to vote for and elect a leader node, the leader node may instead be appointed from the group of nodes on behalf of the group 110.

In such embodiments, at least one attribute associated with one or more of the nodes in the group is identified. A particular node in the group is appointed to be the leader node based at least in part on at least one attribute associated with the particular node being identified that it is desirable for the leader node to possess. Appointment announcement data is transmitted announcing that the particular node has been appointed as the leader node.

Appointing a leader node in this way is relatively straightforward to implement because the leader node is appointed on behalf of the group of nodes. This is more straightforward to implement than an approach in which nodes communicate with each other to vote for, and then elect, a leader node. In some such embodiments, the identifying, appointing and transmitting are performed by a leader node appointment node in the group of nodes. In some such embodiments, the identifying, appointing and transmitting are performed by a leader node appointment entity that is not in the group.

Embodiments comprise appointing the particular node as the leader node based at least in part on determining that the identified at least one attribute associated with the particular node indicates: that the status of particular data stored at the particular node matches a particular status for the particular data; that the particular node belongs to a particular class of node; that the particular node is an active node where the group comprises at least one active node and at least one passive node; that the particular node is a primary node where the group comprises one or more primary nodes and one or more backup nodes; and/or that the particular node is capable of being a leader node. Some embodiments comprise receiving attribute data, wherein the identification is carried out at least in part on the basis of identifying the at least one attribute from the received attribute data.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for use in the upgrade of nodes in a group of nodes in a data communications network, wherein the nodes in the group of nodes comprise telephony equipment, the method comprising:

selecting a coordinator node from the group of nodes based at least in part on the selected coordinator node having one or more properties that makes the selected coordinator node more suitable for being the coordinator node than the one or more other nodes in the group of nodes, wherein the coordinator node is responsible for selecting a leader node for the group of nodes on behalf of the group;

receiving data, by the coordinator node, relating to at least one node in the group, wherein the received data comprises one or more predetermined parameters indicating that a given upgrade has already been applied to the at least one node in the group or the given upgrade is yet to be applied to the at least one node in the group;

identifying, by the coordinator node, one or more nodes in the group to which the given upgrade is yet to be applied, wherein the identification of the one or more nodes to which the given upgrade is yet to be applied is based at least in part on the received data;

identifying, by the coordinator node, one or more further nodes to which the given upgrade has already been applied, wherein the identification of the one or more nodes to which the given upgrade has already been applied is based at least in part on the received data;

selecting a given node, by the coordinator node, from amongst the identified one or more nodes to which the given upgrade is yet to be applied as the leader node for the group, wherein the identified one or more further nodes to which the given upgrade has already been applied are disregarded for the purposes of said selecting the given node as the leader node for the group; and transmitting data, by the coordinator node, indicating that the given node has been selected as the leader node, wherein the upgrade proceeds with the given node as the leader node.

2. A method according to claim 1, comprising receiving the data in response to the given upgrade having been applied to one or more nodes in the group.

3. A method according to claim 1, comprising receiving the data in response to one or more changes to membership of the group.

4. A method according to claim 1, wherein the given upgrade comprises one or more of:
a software upgrade,
a hardware upgrade,
a change of data format, and
a change of data protocol.

5. A method according to claim 1, wherein data communicated by a node to which the given upgrade is yet to be applied can be understood by a node to which the given upgrade has been applied.

6. A method according to claim 5, wherein data communicated by a node to which the given upgrade has been applied cannot be understood by a node to which the given upgrade has not yet been applied.

7. A method according to claim 1, wherein data communicated by a node to which the given upgrade has been applied cannot be understood by a node to which the given upgrade has not yet been applied.

8. A method according to claim 1, comprising deciding whether a different node in the group of nodes should be selected as the leader node based at least in part on detecting one or more predetermined triggers.

9. A method according to claim 8, wherein the one or more detected predetermined triggers comprise the given node no longer being a member of the group of nodes.

10. A method according to claim 8, wherein the one or more detected predetermined triggers comprise failure of the given node.

11. A method according to claim 8, comprising maintaining the selection of the given node as the leader node at least temporarily for a given time period after detection of the one or more predetermined triggers.

12. A method according to claim 8, comprising, in response to detecting the one or more predetermined triggers, selecting a node to which the given upgrade has already been applied as the leader node if the given node was the last remaining node to which the given upgrade had not yet been applied.

13. A method according to claim 12, comprising, after selecting the node to which the given upgrade has already been applied as the leader node, excluding the given node from being a member of the group of nodes until the given upgrade has been applied to the given node.

14. Apparatus for use in the upgrade of nodes in a group of nodes in a data communications network, wherein the nodes in the group of nodes comprise telephony equipment, the apparatus comprising at least one processor and computer program code stored in at least one memory, the at least one memory and the computer program code being configured to, with the at least one processor, cause the apparatus to:

select a coordinator node from the group of nodes based at least in part on the selected coordinator node having one or more properties that makes the selected coordinator node more suitable for being the coordinator node than the one or more other nodes in the group of nodes, wherein the coordinator node is responsible for selecting a leader node for the group of nodes on behalf of the group;

receive data, by the coordinator node, relating to at least one node in the group, wherein the received data comprises one or more predetermined parameters indicating whether a given upgrade has already been applied to the at least one node in the group or the given upgrade is yet to be applied to the at least one node in the group;

identify, by the coordinator node, one or more nodes in the group to which the given upgrade is yet to be applied, wherein the identification of the one or more nodes to which the given upgrade is yet to be applied is based at least in part on the received data;

identify, by the coordinator node, one or more further nodes to which the given upgrade has already been applied, wherein the identification of the one or more nodes to which the given upgrade has already been applied is based at least in part on the received data;

select a given node, by the coordinator node, from amongst the identified one or more nodes to which the given upgrade is yet to be applied as the leader node for the group, wherein the identified one or more further nodes to which the given upgrade has already been applied are disregarded for the purposes of said selecting the given node as the leader node for the group; and transmit data, by the coordinator node, indicating that the given node has been selected as the leader node, wherein the upgrade proceeds with the given node as the leader node.

15. A computer program product comprising a non-transitory computer-readable storage medium having computer readable instructions stored thereon, the computer readable instructions being executable by a computerized device to cause the computerized device to perform a method for use in the upgrade of nodes in a group of nodes in a data communications network, wherein the nodes in the group of nodes comprise telephony equipment, the method comprising:

selecting a coordinator node from the group of nodes based at least in part on the selected coordinator node having one or more properties that makes the selected coordinator node more suitable for being the coordinator node than the one or more other nodes in the group of nodes, wherein the coordinator node is responsible for selecting a leader node for the group of nodes on behalf of the group;

receiving data, by the coordinator node, relating to at least one node in the group, wherein the received data comprises one or more predetermined parameters indicating whether a given upgrade has already been applied to the at least one node in the group or the given upgrade is yet to be applied to the at least one node in the group;

identifying, by the coordinator node, one or more nodes in the group to which the given upgrade is yet to be applied, wherein the identification of the one or more nodes to which the given upgrade is yet to be applied is based at least in part on the received data;

identifying, by the coordinator node, one or more further nodes to which the given upgrade has already been applied, wherein the identification of the one or more nodes to which the given upgrade has already been applied is based at least in part on the received data;

selecting a given node, by the coordinator node, from amongst the identified one or more nodes to which the given upgrade is yet to be applied as the leader node for the group, wherein the identified one or more further nodes to which the given upgrade has already been applied are disregarded for the purposes of said selecting the given node as the leader node for the group; and transmitting data, by the coordinator node, indicating that the given node has been selected as the leader node, wherein the upgrade proceeds with the given node as the leader node.

* * * * *